United States Patent [19]

Koerhsen

[11] Patent Number: 5,566,288
[45] Date of Patent: Oct. 15, 1996

[54] SYSTEM AND METHOD FOR AUTOMATICALLY FITTING A B-SPLINE CURVE TO A SET OF DATA POINTS

[75] Inventor: Craig Koerhsen, Peoria, Ill.

[73] Assignee: Caterpillar Inc., Peoria, Ill.

[21] Appl. No.: 299,095

[22] Filed: Sep. 2, 1994

[51] Int. Cl.$^6$ ................................................. G06F 15/00
[52] U.S. Cl. ............................................................ 395/142
[58] Field of Search .................................... 395/141, 142, 395/143, 140; 345/118, 134

[56] References Cited

U.S. PATENT DOCUMENTS 5,471,573   11/1995   Kaasila .................................... 395/141
5,500,927   3/1996   Sander-Cederlof et al. ........... 395/133

OTHER PUBLICATIONS

Rogers et al., *Mathematical Elements For Computer Graphics*, McGraw–Hill Book Company, New York, pp. 143–155.
Lozover, et al., "Automatic Construction of a Cubic B–Spline Representation For A General Curve," *Computer Graphics*, vol. 7, No. 2, 1983, pp. 149–153.

*Primary Examiner*—Phu K. Nguyen
*Attorney, Agent, or Firm*—Sterne, Kessler, Goldstein & Fox

[57] ABSTRACT

A B-spline curve is automatically generated as an approximating curve to a set of data points. A set of four control points are selected at equal intervals along a path defined by a set of data points. A B-spline curve is generated using these control points and the resultant B-spline curve is compared to the path to determine the separation between the B-spline curve and the path. If the separation exceeds a threshold separation, then additional one or more control points are added and the curve generated. The process of adding one or more control points continues until the curve approximates the path along the data points within a specified level of separation. A control point is then removed from the solution and the curve is then regenerated and again compared to the path. If there is no adverse effect resulting from the removal of this control point, the control point is left out of the solution. If, however, removal of the control point adversely impacted the fit of the B-spline curve to the data points, that control point is returned to the solution. This process of checking a control point to determine whether it can be removed from the solution is repeated for the remainder of the control points.

29 Claims, 1 Drawing Sheet

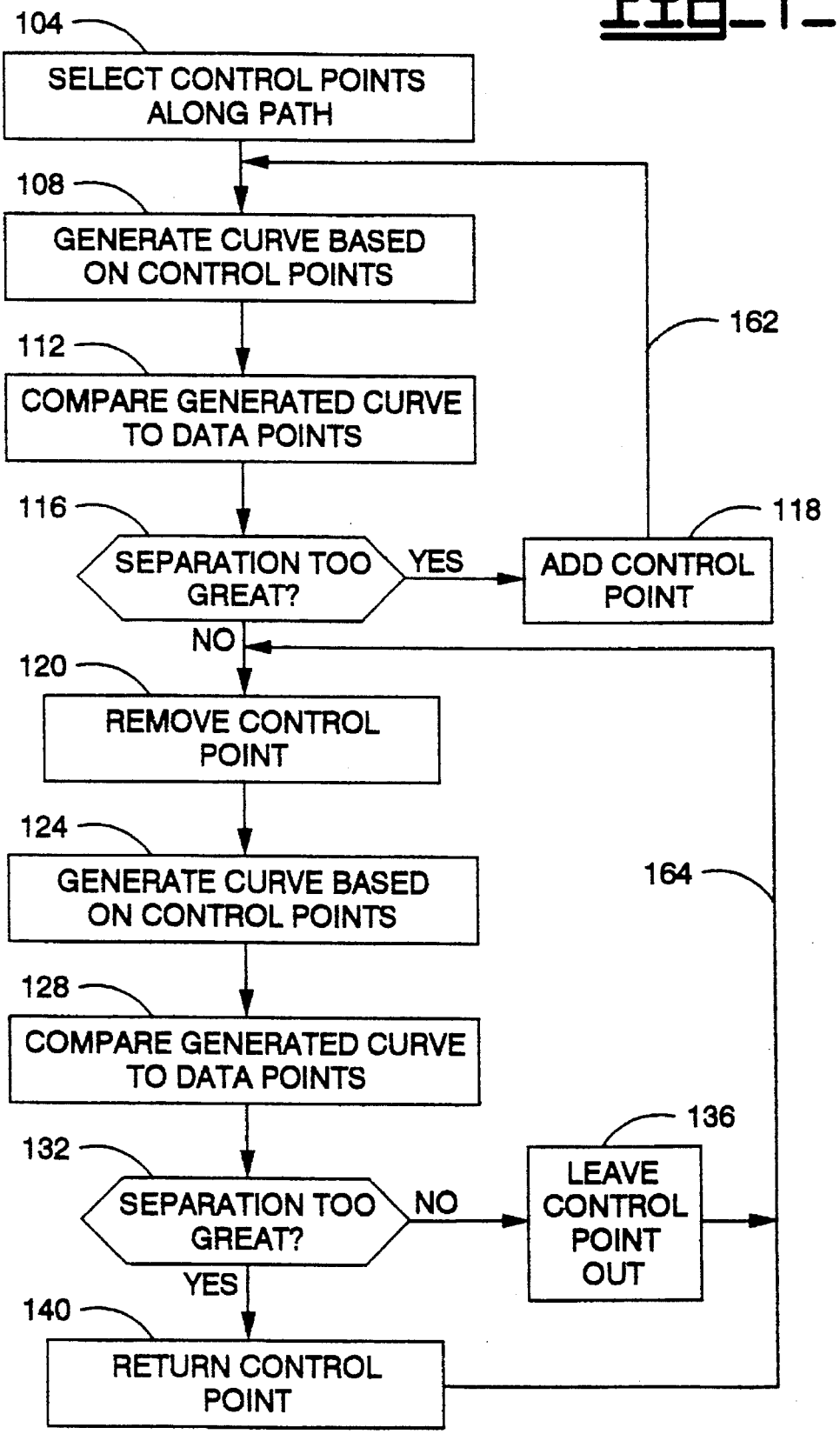
Fig_1_

SYSTEM AND METHOD FOR AUTOMATICALLY FITTING A B-SPLINE CURVE TO A SET OF DATA POINTS

BACKGROUND OF THE INVENTION

1. Field of the Invention

The present invention relates generally to curve fitting, and more specifically, to a method for automatically fitting a curve to a data set using a B-spline.

2. Related Art

In computer graphics terminology, a spline curve is defined as a smooth curve used to approximate a series of data points. To fit a spline curve to a series of data points, a set of control points is selected and these control points are used to define the spline curve.

B-splines are a class of spline curves particularly useful in computer graphics applications. For a set of n+1 control points $P_k$, points on the B-spline curve are defined as:

$$P(t) = \sum_{k=0}^{n} P_k N_{k,i}(t) \qquad (1)$$

where the B-spline function $N_{k,i}$ can be defined as a polynomial of degree i−1.

B-splines can be generated by a method utilizing both manual and automated steps. In this method, the control points are selected by a human operator at locations along the set of data points. To accomplish this, the control points might, for example, be selected in the proximity of the peaks and valleys (local minima and maxima) of the path defined by the set of data points and are selected at locations removed from an imaginary line connecting the data points.

Once the control points are selected, the B-spline curve is drawn according to equation 1. A general purpose computer or graphics workstation is typically used to generate the B-spline curve from the manually selected control points. When the curve is generated, the operator looks at the curve and compares it to the data points. If the curve is close enough, the task is completed. If, however, the curve does not fit the data points to the operator's satisfaction, the operator may relocate the control points or pick additional control points and regenerate the curve.

SUMMARY OF THE INVENTION

The present invention is a method for automatically generating an approximating curve to fit a set of data points. In some environments, a set of data points are used to define a path or a route to be followed. Rather than traversing the route in a series of straight lines whose end points are defined by the data points along the path, it is more efficient to follow an approximating curve fitted to the data points. According to the invention, one such approximating curve, the B-spline curve, is used to approximate the path along the set of data points. The B-spline curve is generated automatically using a processor or computer.

According to the invention, a set of four control points are chosen along the path defined by the data points. In one embodiment, these four control points are chosen as the two data points at each end of the path and two data points equally spaced along the path. A B-spline curve is generated according to these control points and compared to the path.

If the generated B-spline curve deviates from the path (specifically, from one or more data points) by greater than a threshold value, one or more additional control points are added. Preferably, a control point is added at one or more data points in the area where the distance from the path to the B-spline curve is too great (i.e., where a threshold distance is exceeded). The curve is again generated and compared to the path. Control points are added in this manner until the B-spline curve fits the data set within specifications.

Once the B-spline curve fits the data set within the threshold value, the control points are removed, one at a time, and the curve regenerated. The regenerated B-spline curve is then compared to the data points to determine whether the curve is still close enough to the data points (i.e. to determine whether the removal of the control point had an adverse effect on the B-spline curve). If no adverse effect has resulted from the removal of the control point, the control point is left out. If, on the other hand, removal of the control point resulted in too great a separation between the B-spline curve and the data points, the control point is added back into the solution. This process continues until each control point, or a specified set of control points, has been checked in this manner.

One advantage of the invention is that the entire process of drawing the B-spline curve from the set of data points is automated. A human operator is not required to select the control points, nor is an operator required to reposition or add control points to optimize the fit of the B-spline curve.

A further advantage is that complex algorithms are not required to analyze the data set and select the control points. The control points are initially selected by simply placing them equally spaced along the path of data points. A simple measurement of the distance from the B-spline to the data points is used to determine whether and where an additional control point should be added, as well as whether a control point can be removed.

Further features and advantages of the present invention, as well as the structure and operation of various embodiments of the present invention, are described in detail below with reference to the accompanying drawings.

BRIEF DESCRIPTION OF THE DRAWINGS

The present invention is described with reference to the accompanying drawing. In the drawing, like reference numbers indicate identical or functionally similar elements.

FIG. 1 is an operational flow diagram illustrating an automated method for generating an approximating curve.

DETAILED DESCRIPTION OF THE EMBODIMENTS

1. Overview and Discussion of the Invention

The present invention is directed toward an automated method of generating a curve, such as a B-spline curve, to approximates a path or route along a series of data points. The control points that define the B-spline curve are automatically selected by a processor, and the processor generates a first iteration of the B-spline curve. In one embodiment, the control points are selected as being coincident with data points.

The processor compares the first iteration of the B-spline curve with the data points. If the first iteration of the B-spline curve is separated from the data points by too great a distance, one or more additional control points are added. These steps of generating the B-spline curve, comparing the generated curve to the data points, and adding additional control points where a threshold distance is exceeded, are repeated until the generated B-spline curve matches the data points within the threshold distance.

Once the curve is generated, each control point is tested to determine whether it is needed. A first control point is removed and the B-spline curve is then regenerated and compared to the data points. If the B-spline curve is now separated from the data points by too great a distance, the removed control point is added back. If, however, the B-spline curve is not separated from the data points by too great a distance, the removed control point is left out. This process of checking and removing unnecessary control points continues until all control points have been checked.

2. Example Implementation

B-spline approximation curves have been used to approximate curves for computer graphics applications. However, there are other applications that would benefit from the automated generation of the B-spline curves according to the invention. One particular application that illustrates the usefulness of B-spline curves and the automation thereof is navigation. As far as the inventors are aware, no one has used B-spline curves to approximate a route defined by a series of datapoints, nor has anyone used the unique method set forth below for generating the B-spline curve.

In navigation systems, routes are often defined by a series of points. In one environment, a route for sea-going vessels is defined by a series of points called waypoints. The route is followed by steering the vessel from one waypoint to the next. The waypoints are selected such that the route carries the vessel around shoals and other navigation hazards.

In mining operations, trucks and other mining equipment follow routes among the various mine worksites. For example, a dump truck may follow a route from a load site, where rock is loaded into the truck bed, to a crusher, where the rock is dumped for processing. The route followed by the dump truck in this environment can also be defined by a series of points. The route is followed by steering the truck from one point to the next.

In certain autonomous mining operations, the dump truck is operated without a human driver. In these autonomous operations, a navigation system defines the route for the truck to follow. The navigation system controls the vehicle's speed and steering angle to drive the truck along the defined route. Actual position of the truck is compared with its desired position (i.e., a point along the route) when computing steering angles and speeds to maintain the trucks position along the defined route.

Generally, the greater number of data points used to define the route, the smoother the route, One way to smooth the route without increasing the number of data points is to fit an approximating curve (such as a B-spline curve) to the set of data points. This allows the vehicle to follow a smooth curve along the route rather than a straight line between data points with abrupt turns at each data point.

3. Curve Generation

According to one embodiment, a B-spline curve is used to approximate the data points. Although numerous other approximations could be used, the B-spline curve is preferable. As stated above, according to the invention, the B-spline curve is generated to approximate the route defined by the set of data points automatically. One method used for generating the B-spline curve is illustrated in the operational flow diagram of FIG. 1. Referring now to FIG. 1, in a step 104, control points are selected along the path defined by the set of data points. In the embodiment described herein, 4 control points are chosen initially so that a fourth-order B-spline curve is generated. A different number of control points could be chosen in this initial step.

As stated above, one conventional technique of selecting control points was to have a human operator select the points at specific locations on, or in the proximity of, the data points that define the path. When selecting control points, the human operator considered path characteristics such as the slope of the path at various locations as well as the location and radius of turns along the path.

However, according to the present invention, step 104 of selecting control points is performed by a processor. For ease of automation, the control points are not chosen based on the path characteristics, but instead are chosen as a function of the length of the path defined by the set of data points. According to one embodiment, the control points are selected as being the two end data points that make up the path and two additional data points, each based at even intervals along the path. Thus, in this embodiment, one control point is at one end of the path, a second control point is approximately one third of the distance along the path, a third control point is approximately two-third of the distance along the path, and the fourth and final control point is at the second end of the path. Thus, complex algorithms are not required to determine where the control points should be located. Instead, the control points are simply chosen as data points approximately equally spaced along the path.

In a step 108, the processor generates the B-spline curve defined by the control points selected in step 104. The generation of B-spline curves using a processor is well-known in the art as evidenced by numerous publications on the subject. One such publication appears in the text of *Mathematical Elements for Computer Graphics*, by David F. Rogers and Jay Allen Adams, published by the McGraw-Hill Book Company, pages 143–155, which is incorporated herein by reference.

In a step 112, the processor compares the B-spline curve generated in step 108 to the set of data points that the curve is approximating. In one embodiment, this is accomplished by calculating the distance between the curve generated in step 108 and each data point. If the distance between the curve generated in step 108 exceeds a threshold distance in an area of the curve, (as illustrated by decision block 116), one or more control points are added in that area in a step 118. The curve is then regenerated and compared again to the data points to determine the fit in the curve as illustrated by flow line 162.

If, however, the separation does not exceed the threshold (Decision Block 116), no more control points are required. At this time, the operation can continue at a step 120.

One or more additional control points can be selected in one or more areas where the separation exceeds threshold. The selection of one or more additional control points in step 112 can be accomplished in numerous ways, a few of which are described. One way is to add a single control point approximately midway between two existing control points for an area of the curve where the separation exceeds the threshold. This additional control point can be coincident with a data point that is approximately midway between two existing control points, or it can be removed from a data point.

Another way to select an additional control point is to add a control point at a single data point in an area where separation exceeds the threshold, regardless of whether this data point is approximately midway between two existing control points. In one embodiment, the additional control point selected is the data point at which separation from the generated B-spline curve is a maximum in that area. In another embodiment, the additional control point selected is the data point that is approximately in the middle of the area where separation exceeds the threshold.

Yet another way to select additional control points is to add a control point at each data point where the separation exceeds threshold. This is, in most instances, the least effective method as it results in an unnecessary amount of additional control points.

The amount of distance between the approximating curve and the actual data points that is acceptable can be determined based on the environment of the route. For example, if the route to be followed by a mining truck carries that truck through narrow passageways, the allowed tolerance may be less than that acceptable for open terrain. In one embodiment, a separation of plus or minus one-half of a meter is deemed acceptable. If the separation of the approximating curve is greater than one-half meter on either side of a data point, the separation exceeds the threshold.

Because the control points selected in step 104 were not selected based on characteristics of the path other than its length, it is likely that additional control points need to be added in step 118 to constrain the approximating curve to be within acceptable distance from the path. It is further likely that because the first four control points were selected as a function only of the path length, that there are one or more control points that are not required to maintain the desired B-spline curve separation. Therefore, in step 120, a control point is removed and the B-spline curve regenerated in step 124 based on the remaining control points.

In a step 128, this regenerated B-spline curve is compared to the data points to determine the separation between the B-spline curve and the data points. If, in step 132, the separation is too great (e.g., it exceeds the three-meter threshold), the control point is returned in step 140 and the operation continues at step 120 where the next control point is removed. This is illustrated by flowline 164. If, on the other hand, it is determined in step 132, that the distance between the redrawn B-spline curve and the data points does not exceed the threshold, the control point that was removed in step 120 is left out of the solution (i.e. discarded) in step 136.

Again, the operation continues at step 120 to remove the next control point and regenerate the curve to determine whether the removal of that control point adversely affected the fit of the B-spline curve to the data points. This is illustrated by flowline 164. The operation of removing a control point, determining the effect of such removal, and returning or leaving out the control point based on its effect is repeated for each control point along the path. This optimizes the solution by providing a low-order B-spline curve that approximates the data set within the established threshold.

For more efficient operation, the steps 120 through 140 do not have to be repeated for each control point, but only for a subset of the control points. For example, because the two middle control points chosen in step 104 were not chosen based on path characteristics, it is possible that these control points are not critical.

3. Conclusion

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What is claimed is:

1. A method for generating a curve to approximate a set of data points, comprising the steps of:
   (A) selecting a plurality of control points, wherein said control points are selected independently of characteristics of a path formed by the set of data points;
   (B) generating the curve based on said control points;
   (C) comparing the curve to the data points; and
   (D) if the curve is separated from at least one of the data points by more than a threshold amount, then
      (1) selecting an additional control point, and
      (2) repeating steps (B)–(D).

2. The method according to claim 1, further comprising the steps of:
   (E) removing at least one of said control points;
   (F) generating the curve based on said remaining control points; and
   (G) comparing the curve to the data points;
   (H) if the curve is separated from one of the data points by more than said threshold amount, then replacing said removed control point.

3. The method according to claim 2, further comprising the step of repeating said steps (E)–(H) for each of said control points.

4. The method according to claim 2, wherein said step (E) comprises the step of removing said plurality of control points selected in said step (A) that are not end data points.

5. The method according to claim 1, wherein said step of selecting an additional control point comprises the step of selecting all of the data points that are separated from the curve by more than said threshold amount.

6. The method according to claim 1, wherein said step of selecting an additional control point comprises the step of selecting the data point at which separation from the curve is greatest.

7. The method according to claim 1, wherein said step of selecting an additional control point comprises the step of selecting a data point in an area where separation from the curve exceeds said threshold amount.

8. The method according to claim 7, wherein said data point selected is the data point that is separated from the curve by the greatest distance in said area.

9. The method according to claim 7, wherein said data point selected is the data point that is approximately in the middle of said area.

10. The method according to claim 1, wherein said step of selecting an additional control point comprises the step of selecting a control point approximately midway between two existing control points for an area of the curve where the separation exceeds the threshold.

11. The method according to claim 10, wherein said additional control point is coincident with a data point that is approximately midway between two existing control points.

12. The method according to claim 10, wherein said additional control point is not coincident with a data point.

13. The method according to claim 1, wherein each of said control points are coincident with a data point.

14. The method according to claim 1, wherein said step of selecting an additional control point, comprises the step of selecting at least one control point in all areas where said separation exceeds said threshold amount.

15. The method according to claim 1, wherein said step of selecting an additional control point, comprises the step of selecting at least one control point in at least one area where said separation exceeds said threshold amount.

16. The method according to claim 1, wherein the step of selecting a plurality of control points comprises the step of selecting control points of approximately equal spacing along the set of data points.

17. A method for generating a curve to approximate a set of data points, comprising the steps of:

(A) selecting a plurality of control points, wherein said control points are selected independently of characteristics of a path formed by the set of data points;

(B) generating the curve based on said control points;

(C) comparing the curve to the data points; and (D) if the curve is separated from at least one of the data points by more than a threshold amount, then
  (1) selecting an additional control point, and
  (2) repeating steps (B)–(D);

(E) removing at least one of said control points;

(F) generating the curve based on said remaining control points;

(G) comparing the curve to the data points; and (H) if the curve is separated from one of the data points by more than said threshold amount, then replacing said removed control point.

18. The method according to claim 17, wherein said step of selecting an additional control point comprises the step of selecting all of the data points that are separated from the curve by more than said threshold amount.

19. The method according to claim 18, wherein said data point selected is the data point that is separated from the curve by the greatest distance in said area.

20. The method according to claim 19, wherein said additional control point is coincident with a data point that is approximately midway between two existing control points.

21. The method according to claim 19, wherein said additional control point is not coincident with a data point.

22. The method according to claim 18, wherein said data point selected is the data point that is approximately in the middle of said area.

23. The method according to claim 17, wherein said step of selecting an additional control point comprises the step of selecting the data point at which separation from the curve is greatest.

24. The method according to claim 17, wherein said step of selecting an additional control point comprises the step of selecting a data point in an area where separation from the curve exceeds said threshold amount.

25. The method according to claim 17, wherein said step of selecting an additional control point comprises the step of selecting a control point approximately midway between two existing control points for an area of the curve where the separation exceeds the threshold.

26. The method according to claim 17, wherein each of said control points are coincident with a data point.

27. The method according to claim 17, wherein said step of selecting an additional control point, comprises the step of selecting at least one control point in all areas where said separation exceeds said threshold amount.

28. The method according to claim 17, wherein said step of selecting an additional control point, comprises the step of selecting at least one control point in at least one area where said separation exceeds said threshold amount.

29. The method according to claim 17, wherein the step of selecting a plurality of control points comprises the step of selecting control points of approximately equal spacing along the set of data points.

* * * * *